United States Patent
Ng

(10) Patent No.: US 6,751,704 B2
(45) Date of Patent: Jun. 15, 2004

(54) DUAL-L2 PROCESSOR SUBSYSTEM ARCHITECTURE FOR NETWORKING SYSTEM

(75) Inventor: Alvan Wing Ng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 09/732,267

(22) Filed: Dec. 7, 2000

(65) Prior Publication Data

US 2002/0073280 A1 Jun. 13, 2002

(51) Int. Cl.[7] .............................. G06F 12/00
(52) U.S. Cl. .................. 711/120; 711/119; 711/123; 711/130; 711/153; 711/173
(58) Field of Search ............. 711/119–120, 123, 711/130, 153, 173

(56) References Cited

U.S. PATENT DOCUMENTS

| | | | | |
|---|---|---|---|---|
| 5,535,359 A | * | 7/1996 | Hata et al. | 711/119 |
| 5,680,571 A | * | 10/1997 | Bauman | 711/122 |
| 5,704,058 A | * | 12/1997 | Derrick et al. | 711/168 |
| 5,848,241 A | * | 12/1998 | Misinai et al. | 709/213 |
| 6,000,013 A | * | 12/1999 | Lau et al. | 711/119 |
| 6,119,202 A | * | 9/2000 | Borkenhagen et al. | 711/118 |
| 6,292,490 B1 | * | 9/2001 | Gratacap et al. | 370/412 |
| 6,334,175 B1 | * | 12/2001 | Chih | 711/170 |
| 6,425,090 B1 | * | 7/2002 | Arimilli et al. | 713/502 |
| 6,549,984 B1 | * | 4/2003 | Patterson et al. | 711/122 |

* cited by examiner

Primary Examiner—Mano Padmanabhan
Assistant Examiner—Mehdi Namazi
(74) Attorney, Agent, or Firm—Carr LLP; Robert M. Carwell

(57) ABSTRACT

A method for providing a memory scheme in computer architectures in an efficient and cost effective manner. A processor is configured with access to dual-L2 caches, preferably configured to cache program instructions and data in one cache and shared data in another cache. In one embodiment of the present invention, one L2 cache is accessible to networking interface devices. Optionally, the cache accessible by the networking interface devices is configured as networking buffers, providing cache for packet data being sent within a network. By use of this invention, the packet forwarding speeds in a conventional computer architecture may be increased.

15 Claims, 4 Drawing Sheets

DUAL-L2 PROCESSOR SUBSYSTEM ARCHITECTURE FOR NETWORKING SYSTEM

BACKGROUND OF THE INVENTION

1. Field of the Invention

The invention relates generally to computer architectures and, more particularly, to a memory management scheme and architecture for allowing faster access to data and instructions.

2. Description of the Related Art

As computer and networking applications become Input/Output (I/O) intensive, the conventional computer architecture is becoming a limiting factor in obtaining higher processing speeds. Conventional computer architectures typically utilize a processor and memory architecture that creates a bottleneck in accessing data as memory accesses are slow and multiple devices and applications compete for memory access.

Conventional computer architectures generally utilize a cache comprising smaller, high-speed memory in addition to larger, slower main memory, such as Dynamic Random Access Memory (DRAM), in an attempt to increase memory access speeds. The cache typically stores a subset of shared data stored in main memory, which is generally paged in and out of the cache.

Cache is typically configured in multiple levels. Level 1 (L1) cache is usually designed into the processor chip and is commonly referred to as internal cache. Level 2 (L2) cache is the external memory closest to the processor chip. Additional levels are possible, but with each additional level, the access speed typically decreases.

In a microprocessor-based design, when the processor performs a read instruction, the processor first attempts to read the requested data from the cache. If the requested data is found in the cache, the slower main memory is not accessed. If the requested data is not contained in the cache, however, older data is paged out of the cache and the requested data is paged into the cache. The paging of data out of cache frequently requires additional memory delays and memory accesses because the data is frequently shared by other applications and/or devices, and the data must be re-read from the shared memory into the cache, resulting in slower memory access speeds.

The above description is particularly troublesome in networking environments involving the movement of packet data within a networking system. The movement of shared data can be broken down into 3 basic steps: (a) exchange of buffer information or Direct Memory Access (DMA) descriptors, (b) transfer of packet data to and from main memory, and (c) process of packet header by the processor. Steps (a) and (b) involve networking interface devices accessing shared data. Steps (a) and (c) involve the processor accessing the same blocks of shared data. Therefore, shared data are generally accessed by both the networking interface devices and the processor.

Conventional architectures utilizing an L2 cache, however, are designed to provide only the processor with access to the L2 cache. As a result, packet traffic cannot benefit from fast memory such as the L2 cache. Instead, packet buffers are transferred between the cache and the main memory store as they are accessed by the processor and the networking interface devices. In a conventional design, these actions will cause the shuffling of shared data back and forth between the L1/L2 caches and the main memory store.

Prior attempts to fix the limitations of the conventional computer architecture discussed above are not optimal for I/O intensive network router applications. Attempts utilizing DRAM technology are inefficient due to the limited memory bandwidth of the DRAM. Other attempts, such as employing a distributed routing scheme and/or specialized hardware with Static Random Access Memory (SRAM), are generally expensive and involve a redesign of the system.

Therefore, there is a need for a caching scheme to further extend the life of generic computing architecture in networking products to allow an efficient and cost-effective memory scheme.

SUMMARY OF THE INVENTION

The present invention comprises a method for providing an efficient and cost-effective memory caching scheme. This is achieved by configuring a computer memory architecture to utilize dual-L2 caches, preferably configured as an L2 Program Cache and an L2 Packet Cache. By use of this invention, memory access speeds may be increased as paging shared data is decreased and networking interface devices are given access to fast caches.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
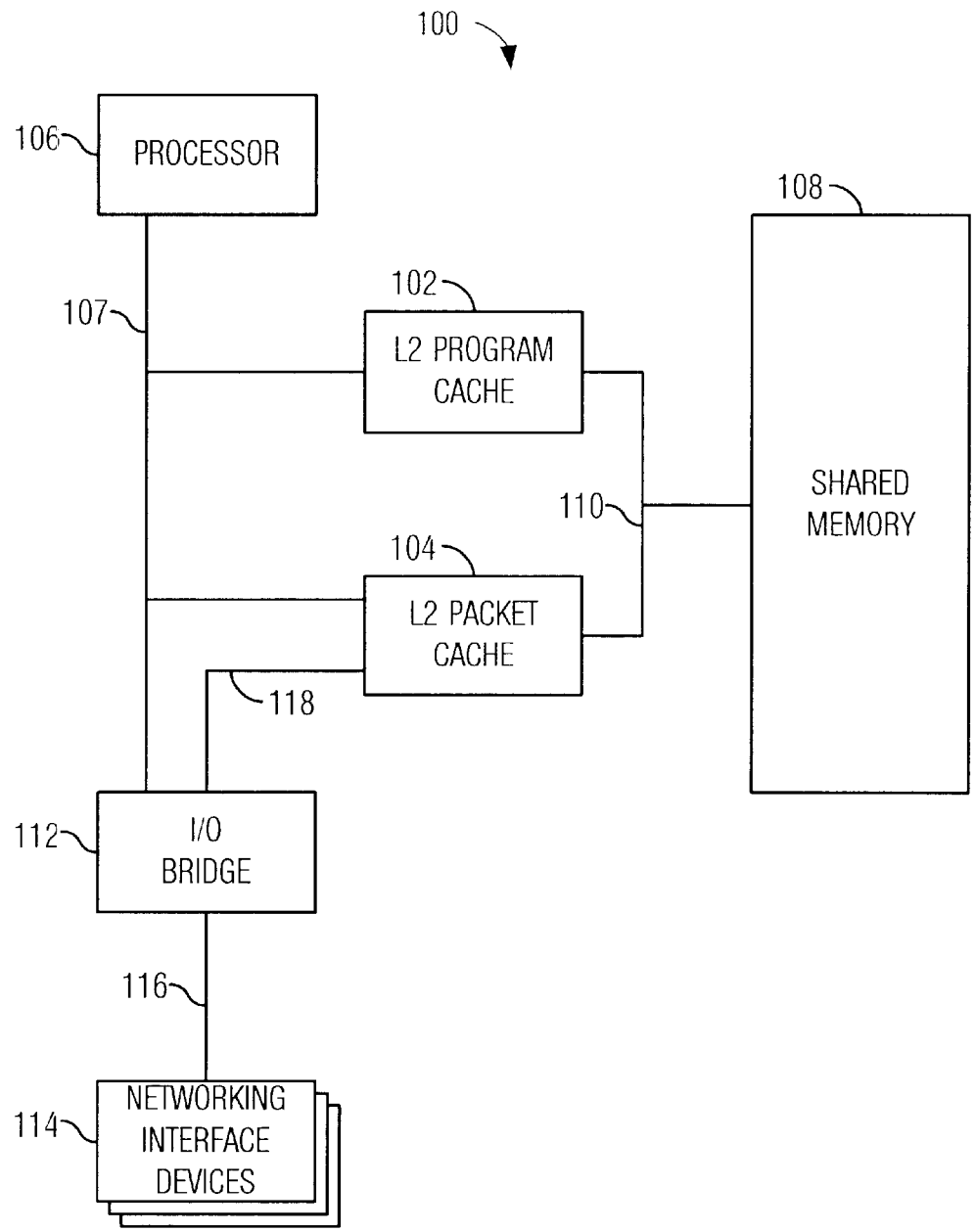
FIG. 1 depicts an embodiment of a computer architecture employing the present invention.

Referring now to FIG. 1 of the drawings, reference numeral 100 illustrates a portion of a computer architecture that embodies features of the present invention. Other components, such as disk drives, device drivers, power supplies, and the like, necessary for the operation of the present invention are considered obvious to one skilled in the art, and are, therefore, not shown or discussed herein.

The computer architecture employs dual-L2 caches 102 and 104, each of which preferably comprises SRAM. Both of the L2 caches 102 and 104 are connected to a processor 106 via a processor bus 107 and a Shared Memory 108 via a memory bus 110. The processor 106 may be a central processing unit (CPU) such as an Intel Pentium-class processor or a Reduced Instruction Set Computer processor, and the like. Preferably, at least one of the dual-L2 102 and 104 caches is accessible by an I/O Bridge 112 via a Cache Memory Bus 118. The I/O Bridge 112 provides access to the L2 Cache 104 to one or more Networking Interface Devices 114 via an I/O Bus 116.

Preferably, the L2 cache 102 is configured as an L2 Program Cache 102, and the L2 cache 104 is configured as an L2 Packet Cache 104. The L2 Program Cache 102 stores program instructions and memory used exclusively by the processor 106, such as application code, program data, routing tables, and the like. The L2 Packet Cache 104, on the other hand, stores memory data that are shared by and transferred between the processor 106 and networking interface devices 114, such as DMA descriptors, packet data, control messages, and the like.

In operation, the L2 caches 102 and 104 store a subset of the data contained in the slower shared memory 108. The processor 106 and the networking interface devices 114 first attempt to retrieve the required data from the L2 caches 102 and 104. If the data is stored in either of the L2 caches 102 or 104, shared memory 108 is not accessed. If the data is not stored in either of the L2 caches 102 or 104, however, the data is retrieved from the shared memory 108. Furthermore, by configuring the L2 caches as an L2 Program Cache 102 and an L2 Packet Cache 104, the processor 106 and the networking interface devices 114 attempt to retrieve shared data from the L2 Packet Cache 104, and the processor 106 retrieves exclusive data from the L2 Program Cache 102, thereby increasing memory access speeds.

The enhanced shared-memory architecture utilizing dual-L2 caches in accordance with the preset invention overcomes the speed limitation of systems utilizing a single L2 cache by providing a separate cache for shared data and limiting the possibility of access conflicts and delays caused by the processor accessing program data simultaneously as a networking interface device is attempting to access shared control data and descriptors and packet data. Additionally, in the case of a system without a dual-L2 cache, the processor frequently accesses the main memory, generally comprising DRAM, where factors like precharge, dead time between read and write cycles, and other timing constraints limit the maximum throughput of a DRAM by affecting sequential random accesses and collision wait times. For instance, a typical cache access cycle in a 66 MHz design is 2-1-1-1 at the cache interface while that of a DRAM is 5-1-1-1 on the memory bus. As a result, this architecture provides a cost-effective alternative to a single large cache of expensive, faster SRAM, which is commonly used to provide faster access than the main memory.

Figure 2:
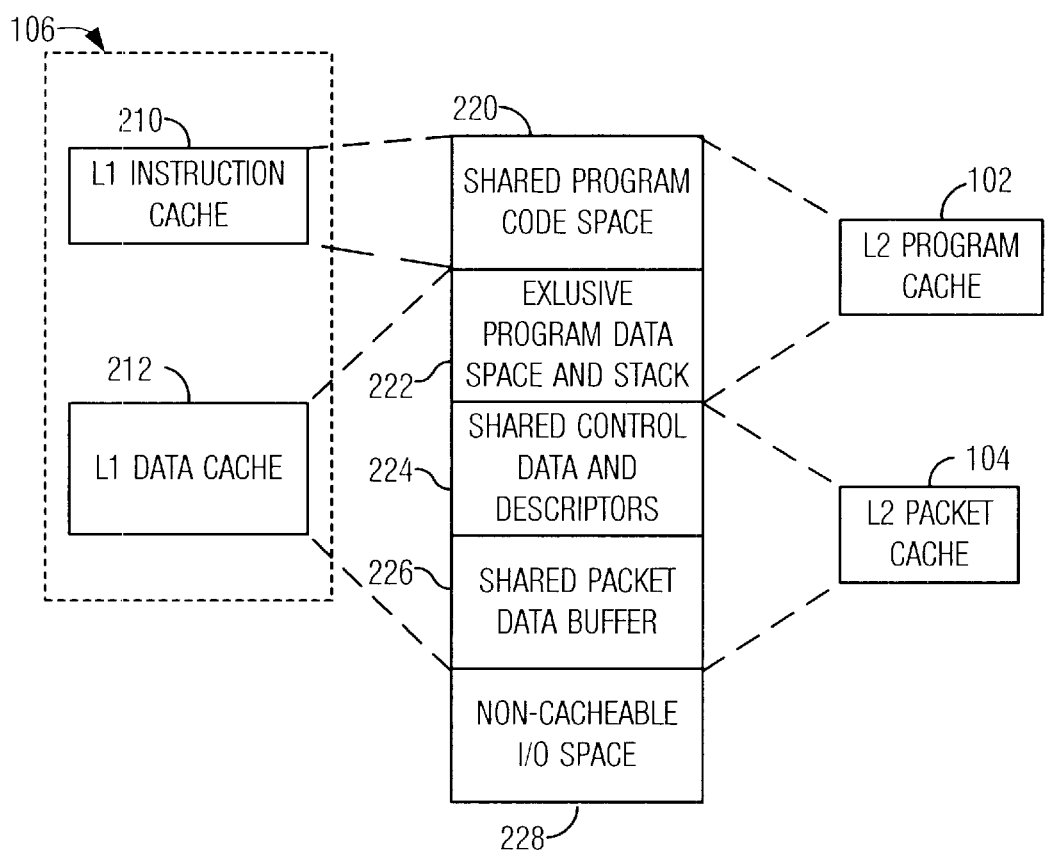
FIG. 2 depicts a memory map of one embodiment of the present invention.

FIG. 2 illustrates a preferred memory map of one embodiment of the present invention particularly useful in the embodiment illustrated in FIG. 1. The processor 106 generally contains L1 caches, which are generally configured as an L1 Instruction Cache 210 and an L1 Data Cache 212. The processor 106 contains additional components, such as an Arithmetic Logic Unit (ALU), read only memory (ROM), a clock, I/O circuitry, and the like, not shown in FIG. 2, but are considered to be well-known to one skilled in the art, and, therefore, will not be described herein. The L1 Instruction Cache 210 generally provides cache to shared Program Code Space 220. The L1 Data Cache 212 generally provides cache to exclusive Program Data Space and Stack 222, shared Packet Control Data and Descriptors 224, and shared Packet Data Buffer 226. The I/O Space 228 is non-cacheable and, therefore, is not mapped to the L1 caches.

As described above, the L2 caches 102 and 104 are preferably configured as an L2 Program Cache and an L2 Packet Cache, respectively. In a preferred embodiment, the L2 Program Cache 102 is mapped to the Shared Program Code Space 220 and the Exclusive Program Data Space and Stack 222, and the L2 Packet Cache 104 is mapped to the Shared Packet Control Data and Descriptors 224 and the Shared Packet Data Buffer 226. The I/O Space 228 remains non-cacheable.

Caching the shared data as described above with respect to FIG. 2 has been found to allow an efficient use of the caches. First, the dual-L2 caches generally split the instruction cache and data caches similar to the caches internal to the processor 106, thereby preventing required instruction data from being paged out for the transient shared data. Second, the L2 Packet Cache 232 provides the Networking Interface Devices 114 with direct access to an L2 cache via the I/O Bridge 112, reducing processor overhead and increasing shared memory access speed.

Figure 3:
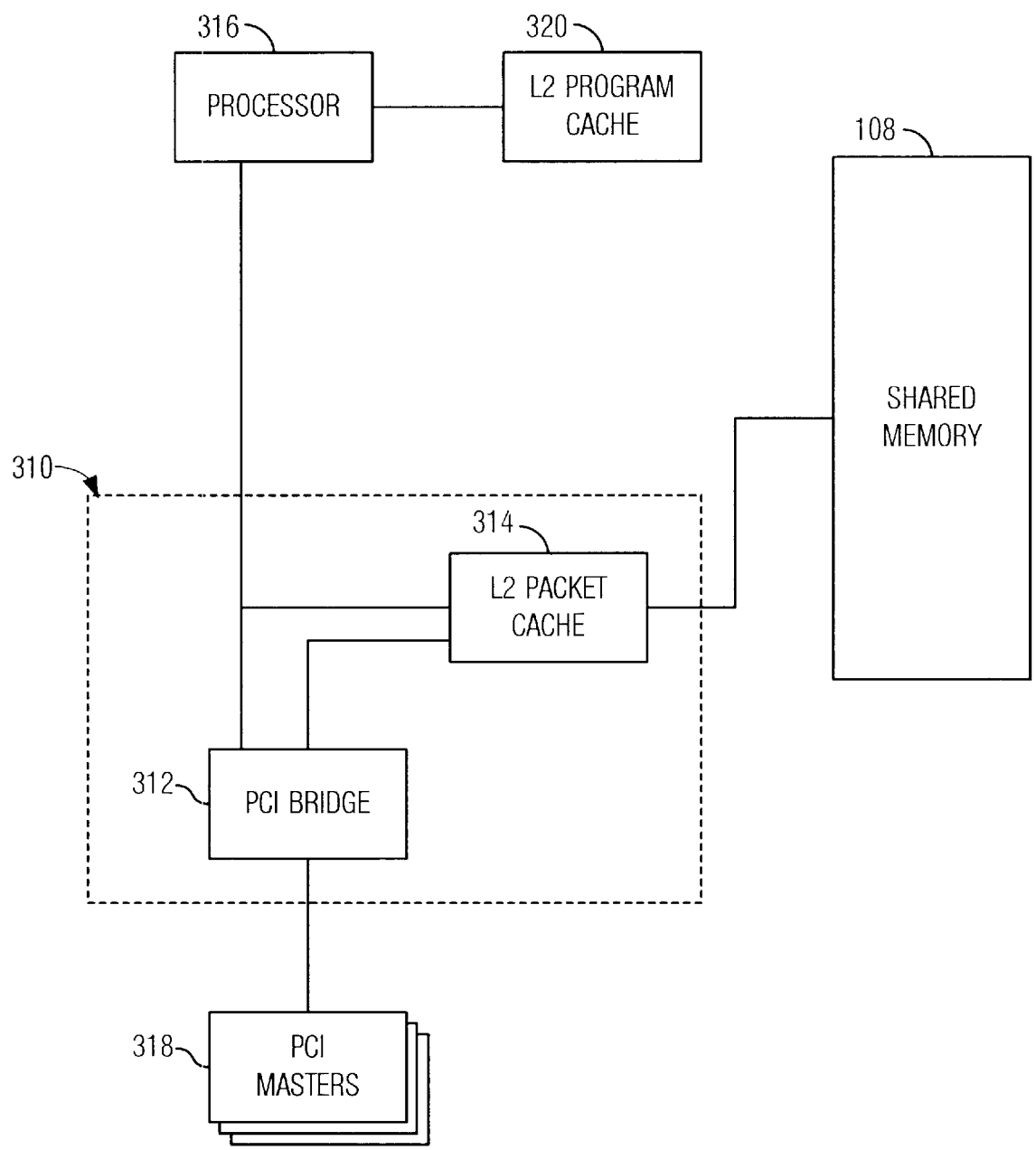
FIG. 3 depicts an alternative embodiment of a computer architecture employing the present invention.

FIG. 3 illustrates an alternative embodiment of the present invention in which one of the dual-L2 caches is available on an interface chip. Accordingly, an interface chip 310, such as the IBM Talos chip, provides a PCI—PCI Bridge 312 and an embedded L2 cache 314. In this instance, it is preferable to configure the L2 cache 314 on the interface chip 310 as an L2 Packet Cache. In this manner, the processor 316, such as an IBM PPC750, and PCI Masters 318 have access to the L2 Packet Cache 314.

This embodiment, however, generally prohibits the L2 Program Cache 320 from being configured to store only the Shared Program Code Space 220 and the Exclusive Program Data Space 222, as illustrated in FIG. 2, because restrictions inherent in the processor 106 allow a user to only enable or disable the L2 cache, not map the memory. Nevertheless, this architecture provides the benefit of providing a Networking Interface Device, such as the PCI Masters, access to the L2 Packet Cache 314.

As a result, the L2 Program Cache 320 stores information required exclusively by the processor 316 as well as information that may also be required by the PCI Masters 318. The processor 316 first attempts to retrieve information from the L2 Program Cache 320, and, if the information is not available, attempts to retrieve the data from the L2 Packet Cache 314. If the information is not available in the L2 Packet Cache 314, the data is retrieved from the shared memory 108. The PCI Masters 318, on the other hand, first attempt to retrieve packet information from the L2 Packet Cache 314 and only retrieves packet information from the shared memory 108 if the information is not stored in the L2 Packet Cache 314.

Figure 4:
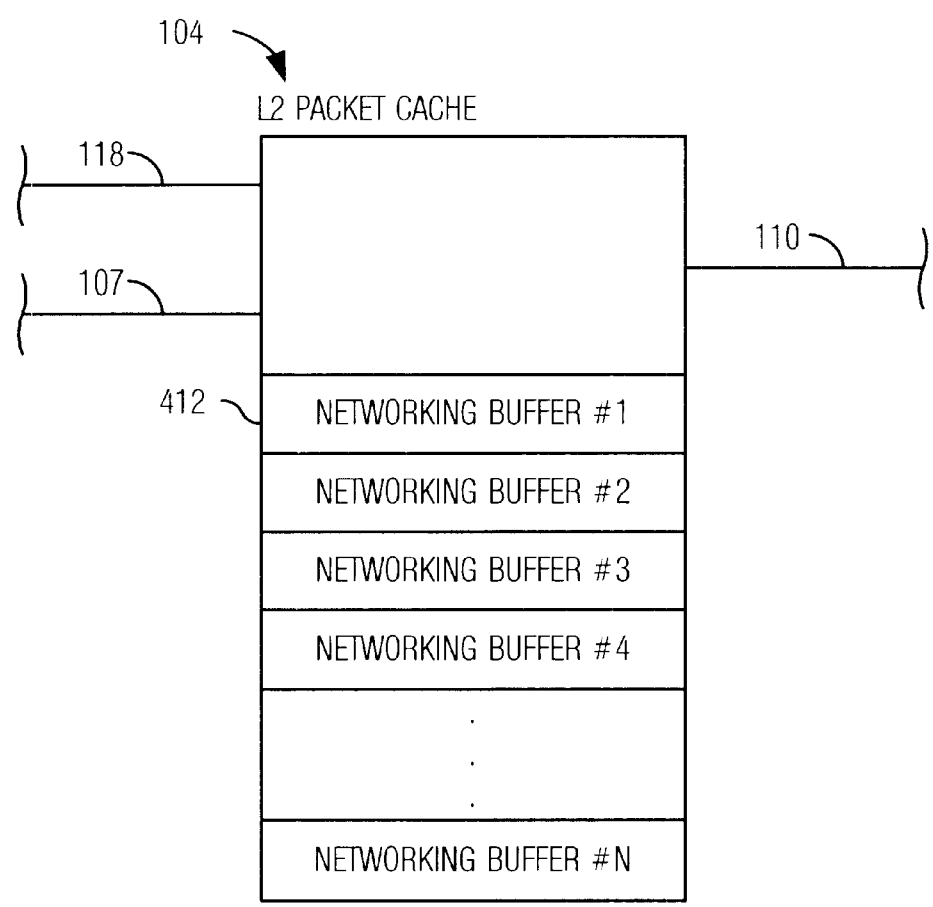
FIG. 4 depicts an embodiment of the present invention in which the L2 Packet Data Cache is configured to comprise networking buffers.

FIG. 4 depicts an enhancement to the embodiment illustrated in FIG. 1, namely, that the L2 Packet Caches 104 is configured as networking buffers 412 to improve packet routing. Likewise, L2 Packet Cache 314 of FIG. 3 may be similarly configured. Preferably, the networking buffers 412 are of sufficient size to store a packet header, approximately 64 bytes for the typical Ethernet application.

When a data packet is stored, the networking buffer 412 is used to cache the data. If the data size exceeds the size of the networking buffer 412, the data overflows into the Shared Memory. In this embodiment, it is preferable to utilize fast SRAM for the L2 cache and less expensive Synchronous DRAM (SDRAM) for the Shared Memory.

This embodiment allows the processor 106 and networking interface devices 114 to transfer short packets into the high-speed cache and allows designers to implement large buffers with less expensive SDRAM while maintaining the performance advantage of fast cache memory. Additionally, since the processor 106 generally only requires access to the packet header, the processor is able to retrieve the packet header from the fast L2 cache instead of the slower Shared Memory.

Moreover, several variations may be made in the foregoing without departing from the spirit or the scope of the invention. For example, an L2 Packet Cache remains advantageous when used with a shared memory comprising Double-Data-Rate (DDR) DRAM, which operates in burst mode with a fixed transfer size. Even though the DDR DRAM is faster than its predecessor DRAM, the DMA descriptors are generally manipulated at the word-size level, causing needless Read-Modify-Write burst cycles. Therefore, an L2 Packet Cache is advantageous to cache the DMA descriptors, avoiding the burst cycles. Additionally, an L2 Packet Cache continues to provide faster access to packet data by overcoming the first access latency inherent in DDR DRAM.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A computer memory architecture for providing a cache memory to one or more processors, the architecture comprising:
   one or more processors;
   at least two Level 2 caches connected in parallel via a bus to the one or more processors for enabling at least one or more processors to store and retrieve data in the at least two level 2 caches; and
   wherein at least one of the at least two Level 2 caches is configured as an L2 Program Cache comprising:
   a shared program code space; and
   an exclusive program data space and stack.

2. The computer memory architecture of claim 1, wherein at least one of the at least two Level 2 caches is configured as an L2 Packet Cache comprising:
   shared control data and descriptors; and
   a shared packet data buffer.

3. The computer memory architecture of claim 1, further comprising one or more networking interface devices connected via an I/O bridge to the one or more processors and the at least two Level 2 caches for enabling the one or more networking interface devices to store and retrieve data in at least one of the at least two Level 2 caches.

4. A computer memory architecture for providing cache memory to one or more processors and one or more networking interface devices, the architecture comprising:
   one or more processors;
   one or more networking interface devices connected via an I/O bridge to the one or more processors;
   a first Level 2 cache connected via a bus to the one or more processors for enabling at least one of the one or more processors to store data to and retrieve data from in the first Level 2 cache, and connected via an I/O bridge to the one or more networking interface devices for enabling the one or more networking interface devices to store data to and retrieve data from the first Level 2 cache;
   a second Level 2 cache connected via a bus to the one or more processors for enabling at least one of the one or more processors to store data to and retrieve data from in the second Level 2 cache, and connected via an I/O bridge to the one or more networking interface devices for enabling the one or more networking interface devices to store data to and retrieve data from the second Level 2 cache; and
   the first Level 2 cache is configured as an L2 Program Cache comprising:
   a shared program code space; and
   an exclusive program data space and stack.

5. The computer memory architecture of claim 4, wherein the second Level 2 cache is configured as an L2 Packet Cache comprising:
   shared control data and descriptors; and
   a shared packet data buffer.

6. A method for providing a cache memory to one or more processors, the architecture comprising:
   one or more processors;
   at least two Level 2 caches connected in parallel via a bus to the one or more processors for enabling at least one or more processors to store and retrieve data in the at least two level 2 caches; and
   wherein at least one of the at least two Level 2 caches is configured as an L2 Program Cache comprising:
   a shared program code space; and
   an exclusive program data space and stack.

7. The method of claim 6, wherein at least one of the at least two Level 2 caches is configured as an L2 Packet Cache comprising:
   shared control data and descriptors; and
   a shared packet data buffer.

8. A method for providing cache memory to one of more processors and one or more networking interface devices, the method comprising the steps of:
   connecting two or more Level 2 caches to at least one of the one or more processors for enabling the one or more processors to store data and retrieve data from the two or more Level 2 caches;
   connecting at least one of the two or more Level 2 caches to at least one of the one or more networking interface devices via an I/O bridge for enabling the one or more networking interface devices to store data to and retrieve data from the two or more Level 2 caches; and
   configuring at least one of the two or more Level 2 caches as an L2 Program Cache comprising:
   a shared program code space; and
   an exclusive program data space and stack.

9. The method of claim 8, further comprising the step of configuring at least one of the two or more Level 2 caches as an L2 Packet Cache comprising:
   shared control data and descriptors; and
   a shared packet data buffer.

10. The method of claim 8, wherein at least one of the two or more Level 2 caches is configured as an L2 Packet Cache accessible to at least one of the one or more processors and to at least one of the one or more networking interface devices, the L2 Packet Cache comprising:
    shared control data and descriptors; and
    a shared packet data buffer.

11. A method for providing cache memory to one or more processors and one or more networking interface devices, the method comprising the steps of:
    providing two or more Level 2 caches;
    configuring at least one of the two or more Level 2 caches as an L2 Program Cache for storing data comprising data stored in a shared memory;
    configuring at least one of the two or more Level 2 caches as an L2 Packet Cache for storing data comprising data stored in a shared memory;
    providing access to at least one of the two or more Level 2 caches by at least one of the one or more processors for retrieving data from and storing data to the at least one of the two or more Level 2 caches; and providing access to at least one of the two or more Level 2 caches by at least one of the one or more networking interface devices for retrieving data from and storing data to the at least one of the two or more Level 2 caches.

12. The method of claim 11, wherein the L2 Program Cache comprises:

a shared program code space; and an exclusive program data space and stack.

13. The method of claim 11, wherein the L2 Packet Cache comprises:

shared control data and descriptors; and a shared packet data buffer.

14. The method of claim 11, further comprising the steps of:

providing the at least one of the processors with access to the L2 Program Cache;

providing at least one of the one or more processors with access to the L2 Packet Cache; and providing at least one of the one or more networking interface devices with access to the L2 Packet Cache.

15. A computer memory architecture for providing a cache memory, the architecture comprising:

one or more processors; and at least one Level 2 cache connected via a bus to the one or more processors at least configured as an L2 Program Cache comprising:

a shared program code space; and an exclusive program data space and stack.

* * * * *

UNITED STATES PATENT AND TRADEMARK OFFICE
CERTIFICATE OF CORRECTION

PATENT NO. : 6,751,704 B2
DATED : June 15, 2004
INVENTOR(S) : Alvan Wing Ng

It is certified that error appears in the above-identified patent and that said Letters Patent is hereby corrected as shown below:

Drawings,
Sheet 2, Figure 2, the reference numeral 222 should appear as follows:
"-EXLUSIVE-" should read -- -EXCLUSIVE- --

Signed and Sealed this

Seventh Day of June, 2005

JON W. DUDAS
*Director of the United States Patent and Trademark Office*